United States Patent
Wang et al.

(10) Patent No.: US 12,436,133 B1
(45) Date of Patent: Oct. 7, 2025

(54) QUARTZ CRYSTAL MICROBALANCE AND DETECTION METHOD AND APPARATUS BASED ON QUARTZ CRYSTAL MICROBALANCE

(71) Applicant: NANJING UNIVERSITY, Nanjing (CN)

(72) Inventors: Wei Wang, Nanjing (CN); Yunlong Lian, Nanjing (CN); Ben Niu, Nanjing (CN); Haoran Li, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 19/190,844

(22) Filed: Apr. 28, 2025

(30) Foreign Application Priority Data

Sep. 2, 2024 (CN) .......................... 202411226137.9

(51) Int. Cl.
*G01N 29/02* (2006.01)
*G01N 29/24* (2006.01)

(52) U.S. Cl.
CPC ....... *G01N 29/022* (2013.01); *G01N 29/2418* (2013.01); *G01N 2291/014* (2013.01)

(58) Field of Classification Search
CPC ............. G01N 29/022; G01N 29/2418; G01N 2291/014
See application file for complete search history.

(56) References Cited

U.S. PATENT DOCUMENTS

2023/0341355 A1* 10/2023 Johnson ............. G01N 29/4427

FOREIGN PATENT DOCUMENTS

| CN | 103149110 A | 6/2013 |
|---|---|---|
| CN | 206488848 U | 9/2017 |
| JP | 2008070158 A | 3/2008 |

OTHER PUBLICATIONS

Plikusiene, Ieva, et al. "Spectroscopic ellipsometry and quartz crystal microbalance with dissipation for the assessment of polymer layers and for the application in biosensing." Polymers 14.5 (2022): 1056. (Year: 2022).*

Sans, Jordi, Ingrid Azevedo Gonçalves, and Robert Quintana. "Establishing Quartz Crystal Microbalance with Dissipation (QCM-D) Coupled with Spectroscopic Ellipsometry (SE) as an Advantageous Technique for the Characterization of Ultra-Thin Film Hydrogels." Small 20.30 (2024): 2312041. (Year: 2024).*

* cited by examiner

*Primary Examiner* — Robert J Eom

(74) *Attorney, Agent, or Firm* — Bayramoglu Law Offices LLC

(57) ABSTRACT

A quartz crystal microbalance includes a resonant module, an optical imaging module, and a data processing module. The optical imaging module includes a microscope, and an image acquisition device. An assembly model is fixed on the microscope objective stage. The image acquisition device performs optical imaging on a surface of QCM chip magnified by the microscope to obtain an image, and sends the image to the data processing module. The data processing module analyzes and processes the image to determine an optical resonant frequency of a sample to be tested. The mass of the sample to be tested is determined according to the optical resonant frequency. QCM measurement sensitivity is improved, without the limitation of Sauerbrey equation, and the resonant frequencies of different positions on the surface of QCM chip are simultaneously measured, thus realizing the multi-channel and multi-sample detection of a single chip.

20 Claims, 13 Drawing Sheets

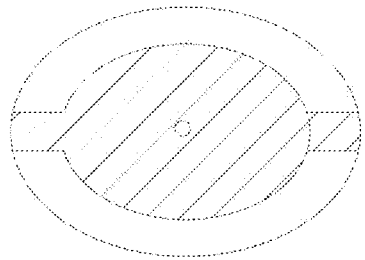 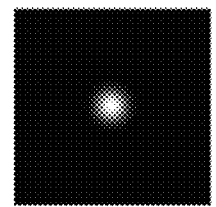 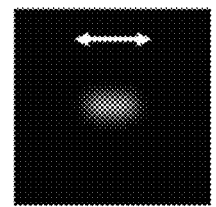
(a)                  (b)                  (c)
FIG. 4A           FIG. 4B           FIG. 4C
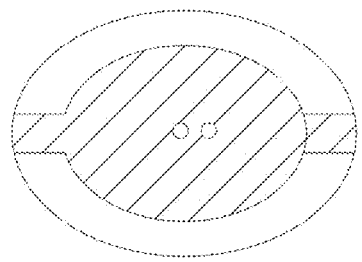 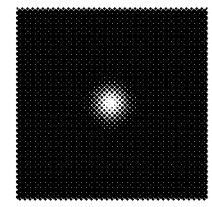 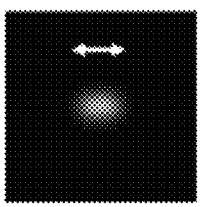
(a)                  (b)                  (c)
FIG. 5A           FIG. 5B           FIG. 5C
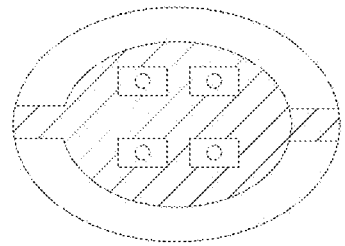 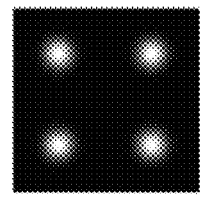 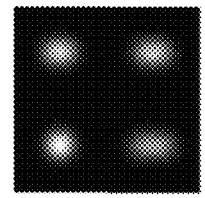
(a)                  (b)                  (c)
FIG. 6A           FIG. 6B           FIG. 6C

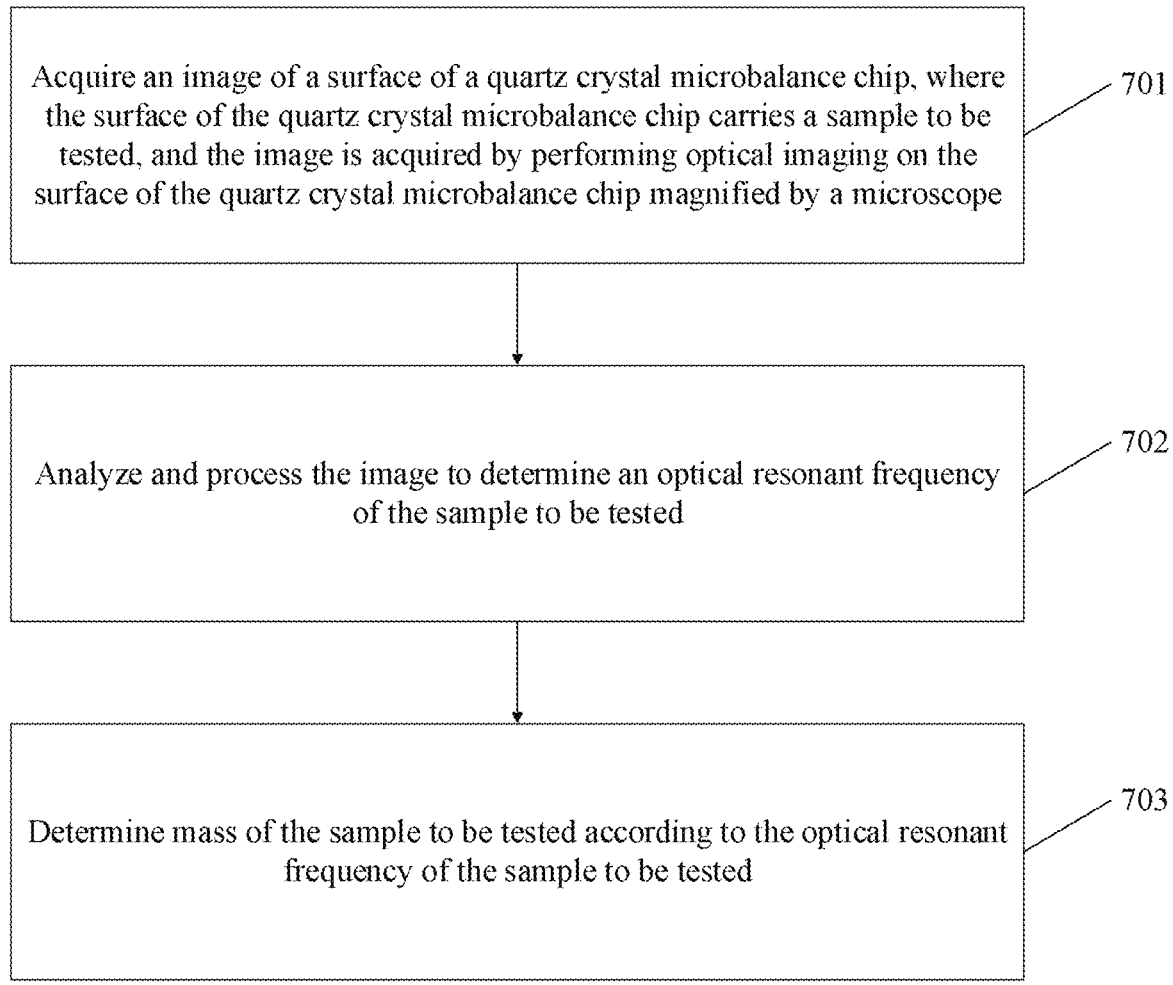
FIG. 7
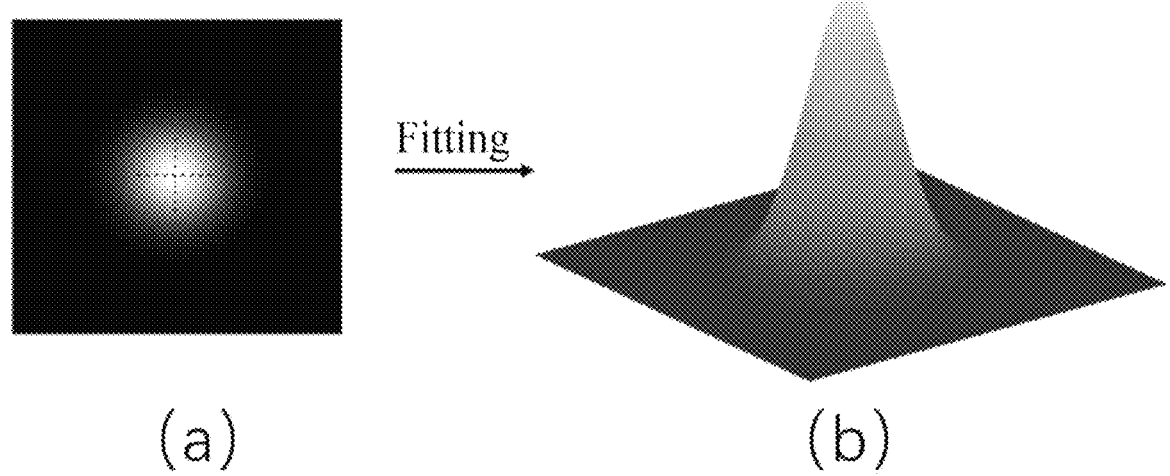
FIG. 8A
FIG. 8B (a)

Fitting (b)

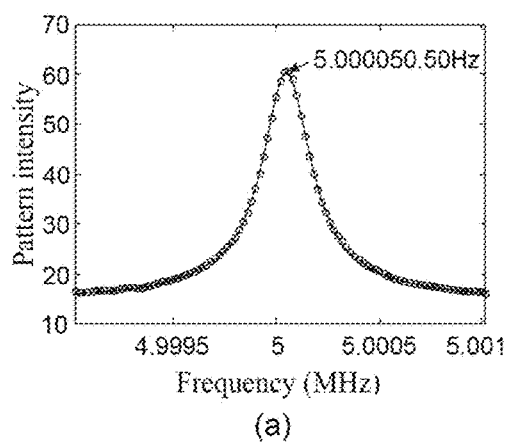 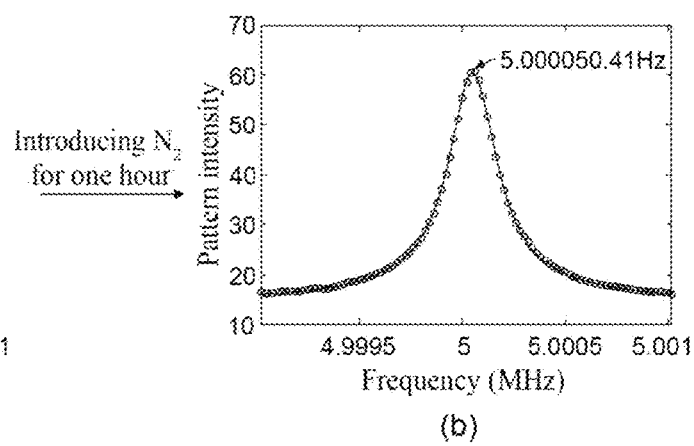
FIG. 14A
FIG. 14B

QUARTZ CRYSTAL MICROBALANCE AND DETECTION METHOD AND APPARATUS BASED ON QUARTZ CRYSTAL MICROBALANCE

CROSS-REFERENCE TO THE RELATED APPLICATIONS

This application is based upon and claims priority to Chinese Patent Application No. 202411226137.9, filed on Sep. 2, 2024, the entire contents of which are incorporated herein by reference.

TECHNICAL FIELD

The present disclosure relates to the technical field of micro-mass measurement, and in particular to a quartz crystal microbalance, and a detection method and apparatus based on the quartz crystal microbalance.

BACKGROUND

This section is intended to provide background or context for the embodiments of the present disclosure described herein. The descriptions in this section does not constitute an admission of prior art.

Sauerbrey equation applied to the mass change of a hard film on the quartz crystal surface presents the quantitative relationship between the vibration frequency of the quartz crystal and its surface mass change. Quartz crystal microbalance (QCM) has developed rapidly as a technology for measuring the mass change at microgram or even nanogram level. Up to now, QCM can be used to measure the mass change of the hard film, and the dissipative QCM can also be used to measure the mass change of a soft film. The common commercial QCM has mass sensitivity of 0.7 $ng/cm^2$.

However, the mass sensitivity of the existing QCM cannot be further improved to a picogram (pg) or even femtogram (fg) level. As the current QCM detection method still belongs to the scope of conventional QCM detection, the mass sensitivity of the QCM can only be improved by increasing the resonant frequency of the QCM chip, and the increase of the chip resonant frequency requires thinning the chip thickness. Excessive thinning of the chip thickness would lead to the strength decrease of the QCM chip, making the chip become fragile and reducing the reliability and life of the chip. In order to improve the mass sensitivity of detection, an innovative detection principle needs to be proposed. Meanwhile, the conventional electrical detection mode has no spatial resolution, and thus the conventional QCM can detect only one sample each time on the surface of the same chip. The conventional multi-channel QCM can merely conduct experiments on multiple chips simultaneously, and the increase in the number of channels would lead to an exponential increase in the system complexity, making it extremely difficult to achieve a breakthrough. In addition, due to the limitation of Sauerbrey equation, the conventional QCM can only detect the mass change of the film deposited on the surface, and the powder sample needs to be pretreated to form a film on the surface of the QCM chip for detection.

SUMMARY

An embodiment of the present disclosure provides a quartz crystal microbalance (QCM) for improving the sensitivity of the QCM without the limitation of Sauerbrey equation, and simultaneously measuring resonant frequencies of different positions of a QCM chip, thereby achieving multi-channel and multi-sample detection of a single chip. The QCM includes a resonant module, an optical imaging module, and a data processing module.

The resonant module includes an assembly model, and a resonant voltage source.

The assembly model includes a QCM chip, a surface of the QCM chip carries a sample to be tested, and the resonant voltage source is configured to drive the QCM chip.

The optical imaging module includes a microscope, and an image acquisition device.

The assembly model is fixed on an objective stage of the microscope. The microscope is configured to magnify the sample to be tested. The image acquisition device is configured to perform optical imaging on the sample to be tested magnified by the microscope to acquire an image, and send the image to the data processing module.

The data processing module is configured to analyze and process the received image to determine an optical resonant frequency of the sample to be tested, and determine mass of the sample to be tested according to the optical resonant frequency.

An embodiment of the present disclosure provides a detection method based on the QCM for improving the sensitivity of the QCM without the limitation of Sauerbrey equation, and simultaneously measuring resonant frequencies of different positions of the QCM chip, thereby achieving multi-channel and multi-sample detection of the single chip. The method is applied to the above QCM, including:

acquiring an image of the surface of the QCM chip, where the surface of the QCM chip carries a sample to be tested, and the image is acquired by performing optical imaging on the sample to be tested magnified by a microscope;

analyzing and processing the image to obtain an optical resonant frequency of the sample to be tested; and determining mass of the sample to be tested according to the optical resonant frequency of the sample to be tested.

An embodiment of the present disclosure provides a detection apparatus based on the QCM for improving the sensitivity of the QCM without the limitation of Sauerbrey equation, and simultaneously measuring resonant frequencies of different positions of the QCM chip, thereby achieving multi-channel and multi-sample detection of the single chip. The apparatus is applied to the above QCM, including:

an acquisition module, configured to acquire an image of the surface of the QCM chip, where the surface of the QCM chip carries a sample to be tested, and the image is acquired by performing optical imaging on the sample to be tested magnified by a microscope;

an analysis module, configured to analyze and process the image to determine an optical resonant frequency of the sample to be tested; and a mass determining module, configured to determine mass of the sample to be tested according to the optical resonant frequency of the sample to be tested.

An embodiment of the present disclosure further provides a computer device, including: a memory, a processor, and a computer program stored on the memory and operating on the processor, where the processor, when executing the computer program, implements the detection method based on the QCM above.

An embodiment of the present disclosure further provides a computer readable storage medium storing a computer program, where the computer program, when executed by a processor, implements the detection method based on the QCM above.

An embodiment of the present disclosure further provides a computer program product, including a computer program. The computer program, when executed by a processor, implements the detection method based on the QCM above.

Compared with the conventional QCM in the prior art, the QCM in an embodiment of the present disclosure includes a resonant module, an optical imaging module, and a data processing module. The resonant module includes an assembly model, and a resonant voltage source. The assembly model includes a QCM chip, and a surface of the QCM chip carries a sample to be tested. The resonant voltage source is configured to drive the QCM chip. The optical imaging module includes a microscope, and an image acquisition device. The assembly model is fixed on an objective stage of the microscope. The microscope is configured to magnify the sample to be tested. The image acquisition device is configured to perform optical imaging on the sample to be tested magnified by the microscope to acquire an image, and send the image to the data processing module. The data processing module is configured to analyze and process the received image to determine an optical resonant frequency of the sample to be tested. The mass of the sample to be tested can be determined according to the optical resonant frequency. The sensitivity of the QCM can be enhanced, without the limitation of Sauerbrey equation, and the resonant frequencies of different positions on the QCM chip are simultaneously measured, thus realizing the multi-channel and multi-sample detection of the single chip.

BRIEF DESCRIPTION OF THE DRAWINGS

To describe the technical solutions of the embodiments of the present disclosure or in the prior art more clearly, the accompanying drawings for describing the embodiments or the prior art would be briefly introduced below. Apparently, the accompanying drawings in the following description show merely some embodiments of the present disclosure, and those of ordinary skill in the art may still derive other drawings from these accompanying drawings without creative efforts. In the drawings:

FIGS. 4A-4C are diagrams of an image acquired by using a QCM on a surface of a QCM chip with only an optical label according to an embodiment of the present disclosure;

FIGS. 5A-5C are diagrams of an image acquired by using a QCM on a surface of a QCM chip with single particles deposited around a labeled particle according to an embodiment of the present disclosure;

FIGS. 6A-6C are diagrams of an image acquired by using a QCM on a surface of a QCM chip deposited with multiple optical labels to form a high-throughput array according to an embodiment of the present disclosure;

FIG. 7 is a flow chart of a detection method based on a QCM according to an embodiment of the present disclosure;

FIGS. 8A-8B are schematic diagrams for determining an ellipticity when an amplitude is 0 pixel according to an embodiment of the present disclosure;

FIGS. 11A-11C are schematic diagrams of a resonant frequency of a QCM chip obtained by a detection method based on a QCM according to an embodiment of the present disclosure;

FIGS. 14A-14B are diagrams for frequency change before and after one hour of nitrogen purge of molecular sieves (inert to nitrogen) without any reaction using QCM according to an embodiment of the present disclosure;

DETAILED DESCRIPTION OF THE EMBODIMENTS

In order to make the objectives, technical solutions and advantages of the present disclosure more clear, the embodiments of the present disclosure are further described in detail below with reference to the accompanying drawings. Here, the illustrative embodiments of the present disclosure and descriptions thereof are used to explain the present disclosure, and do not constitute a limitation of the present disclosure.

The acquisition, storage, use and processing of data in the technical solution of the present disclosure all comply with the relevant provisions of laws and regulations.

Figure 1:
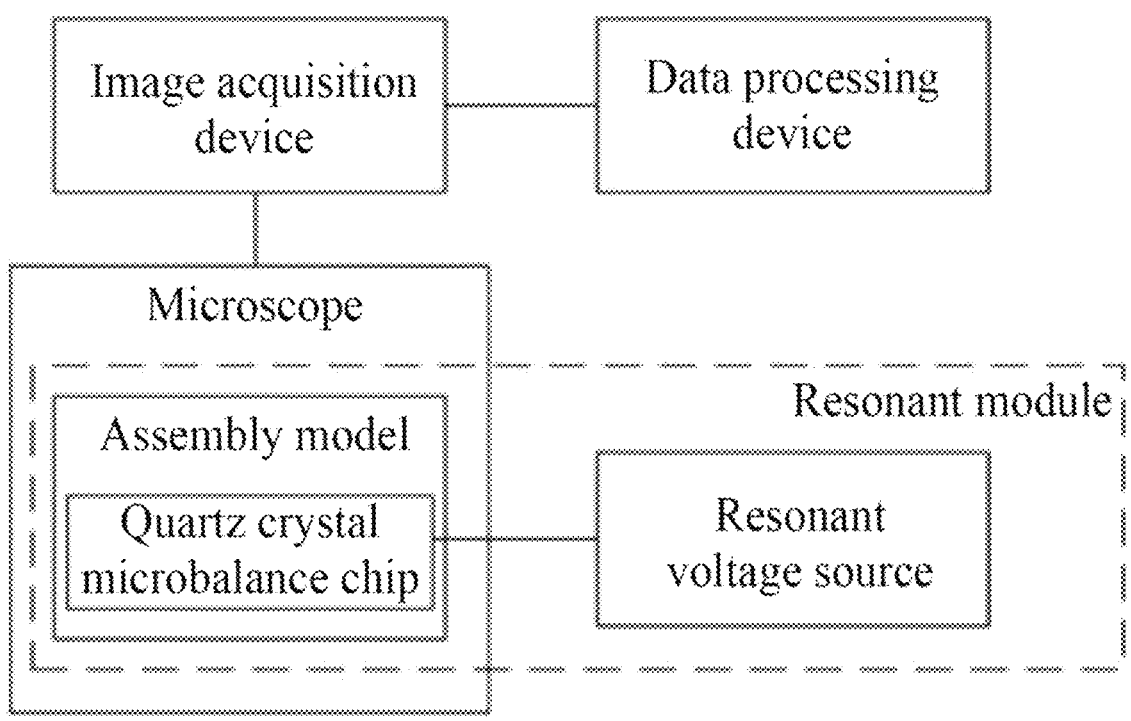
FIG. 1 is a diagram of a quartz crystal microbalance (QCM) according to an embodiment of the present disclosure.

To solve the problems in the prior art, an embodiment of the present disclosure provides a quartz crystal microbalance (QCM). FIG. 1 is a diagram of QCM according to an embodiment of the present disclosure. As shown in FIG. 1, the QCM in the embodiment of the present disclosure may include a resonant module, an optical imaging module, and a data processing module.

The resonant module includes an assembly model, and a resonant voltage source.

The assembly model includes a QCM chip, a surface of the QCM chip carries a sample to be tested, and the resonant voltage source is configured to drive the QCM chip.

The optical imaging module includes a microscope, and an image acquisition device.

The assembly model is fixed on an objective stage of the microscope. The microscope is configured to magnify the sample to be tested. The image acquisition device is configured to perform optical imaging on the sample to be tested magnified by the microscope to acquire an image, and send the image to the data processing module.

The data processing module is configured to analyze and process the received image to determine an optical resonant frequency of the sample to be tested, and determine mass of the sample to be tested according to the optical resonant frequency.

QCM provided by the embodiment of the present disclosure can enhance the sensitivity of the QCM, without the limitation of Sauerbrey equation, and simultaneously measure the resonant frequencies of different positions on the QCM chip, realizing the multi-channel and multi-sample detection of a single chip.

The present disclosure would be further described below with reference to the accompanying drawings and specific embodiments, but the following embodiments are merely used to illustrate the present disclosure in detail and do not limit the scope of the present disclosure in any way.

In an embodiment, in order to characterize the frequency change of a large-particle, irregular sample in the reaction process, the surface of the QCM chip also carries an optical label added by deposition or etching when the sample to be tested meets one or any combination of the following conditions: a volume is larger than a preset volume, and optical contrast is smaller than preset optical contrast. The data processing module is specifically configured to simultaneously determine an optical resonant frequency of all the optical label and sample to be tested in a field of view according to the received images, determine the optical resonant frequency of the optical label according to the size of the optical label, and comprehensively determine the mass of the sample to be tested according to the integral optical resonant frequency of the optical label and the sample to be tested, as well as the optical resonant frequency of the optical label.

In an embodiment, the optical label can be added to the surface of the QCM chip by physical deposition, electrochemical deposition, photothermal deposition, electron beam deposition, electrochemical etching, photochemical etching, etc., facilitating the characterization of the frequency change of the large-particle, irregular sample in the reaction process. When there are only small-particle samples in the reaction process, the optical label may not be used. During the measurement for the reaction process of the large-particle, inhomogeneous sample and the sample with poor optical contrast, the QCM chip is pretreated, with the purpose of adding the optical label on the surface of the QCM chip. The methods for adding the optical label include physical deposition, electrochemical deposition, photothermal deposition, electron beam deposition, electrochemical etching, and photochemical etching.

Physical deposition refers to directly dispersing small, non-reactive particles with a uniform particle size, produced commercially, into a solution according to a required labeled area density, then dropping the solution directly on the surface of the QCM chip, and standing for a period of time to deposit a uniform optical label on the surface of the QCM chip.

Electrochemical deposition refers to depositing non-reactive particles of the measured reaction process on an electrode on the surface of the QCM chip through an ultra-micro electrode, where the position and size of the optical label can be accurately controlled.

Photothermal deposition refers to depositing inactive particles of the reaction process on the electrode on the surface of the QCM chip by laser and different reactive solutions, where the position and size of the optical label can be accurately controlled.

Electron beam deposition refers to site-directed deposition of carbon particles at any position on the surface of the QCM chip by an electron beam from an electron microscope, where the position and size of the optical label can be accurately controlled.

Electrochemical etching refers to a method for etching off part of the electrode on the surface of the QCM chip through the ultra-micro electrode. The method has the characteristic of accurately controlling the position of the optical label, avoiding additional mass load and having no influence on reaction measurement.

Photochemical etching refers to a method for etching off part of the electrode on the surface of the QCM chip through the combination of the laser and the reactive solution. The method has the characteristic of accurately controlling the position of the optical label, avoiding additional mass load and having no influence on reaction measurement.

In an embodiment, in order to determine a variation of the mass of the sample to be tested, the assembly model may also include a reaction cell. The QCM chip is clamped in the reaction cell. The reaction cell is a cell for pre-encapsulating reactants and samples, or a flow cell. The flow cell is configured to provide a flow channel for the reactant, thus enabling the reactant to react with the sample to be tested on the surface of the QCM chip. The image acquisition device is specifically configured to perform optical imaging on the sample to be tested magnified by the microscope before reaction to generate a first image, perform optical imaging on the sample to be tested magnified by the microscope after reaction to generate a second image, and send the first image and the second image to the data processing module. The data processing module is specifically configured to generate a first optical resonant frequency of the sample to be tested according to the received first image, generate a second optical resonant frequency of the sample to be tested according to the received second image, and determine the variation of the mass of the sample to be tested according to the first optical resonant frequency and the second optical resonant frequency.

In an embodiment, the sample to be tested may be a sample capable of reacting with a gas or liquid, and thus the reactant may be the gas or liquid, and the flow cell may be a gas flow cell, or a liquid flow cell.

A reactant fluid can be introduced into the flow cell to react with the sample to be tested on the surface of the QCM chip, thus detecting the variation of the mass of the sample to be tested. For example, the optical resonant frequency of the surface of the QCM chip is calculated at first, nitrogen is introduced into the flow cell, followed by ammonia, the optical resonant frequency is calculated after a period of stabilization, and finally, the nitrogen is introduced, and the optical resonant frequency is calculated again after a period of stabilization. That is, ammonia adsorption leads to an increase in mass, causing the resonant frequency at the location of the particles to decrease; and the nitrogen purge leads to desorption for portion of the ammonia, causing the resonant frequency at the location of the particles to increase. The variations of the mass of the sample to be tested before and after the reaction can be obtained by calculating the optical resonant frequencies of the surface of the QCM chip before and after ammonia reaction, and the variations of the mass of the sample to be tested before and after ammonia desorption can be obtained by calculating the optical resonant frequencies of the surface of the QCM chip before and after ammonia desorption.

Gas or liquid that does not react with the surface of the QCM chip may also be introduced to verify the detection accuracy of the QCM. For example, it is known that a molecular sieve would not absorb the nitrogen. A resonant frequency of the molecular sieve is measured to be 5,000,050.50 Hz before the nitrogen is introduced, and the resonant frequency of the molecular sieve is measured to be 5,000,050.41 Hz after the nitrogen is introduced for 1 hour. After repeating for many times, it can be proved that the detection accuracy of the QCM can reach 0.1 Hz, indicating that the mass sensitivity of the QCM can be greatly improved through the change of the detection principle, thus laying a foundation for further high-throughput measurement of the micro-mass in future.

In an embodiment, to enable the gas or liquid to pass through the flow cell and react with the sample to be tested carried on the surface of the QCM chip, the assembly model further includes a peristaltic pump connected to the flow cell, and the peristaltic pump is configured to drive the gas or liquid to pass through the flow cell.

In an embodiment, to enable light to enter or exit the flow cell for image acquisition, the flow cell may be provided with a light window. The light window is configured to enable the light to enter or exit the flow cell. The microscope is specifically configured to magnify the surface of the QCM chip through the light window.

In an embodiment, to make the acquired image of the surface of the QCM chip more clear and stable, the optical imaging module may also include a light source, which is configured to illuminate the surface of the QCM chip.

In an embodiment, an imaging mode of the optical imaging module can include one of the following: transmission bright-field imaging, reflection bright-field imaging, reflection dark-field imaging, or differential interference imaging.

Figure 2A:
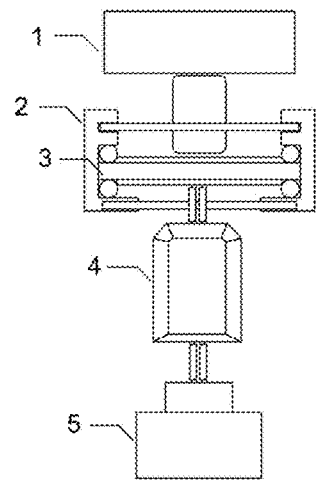
FIGS. 2A-2C are diagrams of a specific example of QCM according to an embodiment of the present disclosure.
Figure 2B:
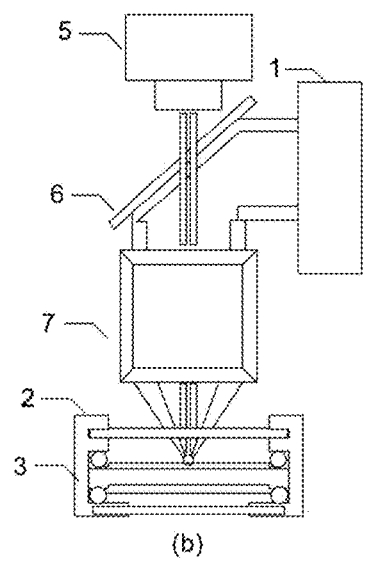
Figure 2C:
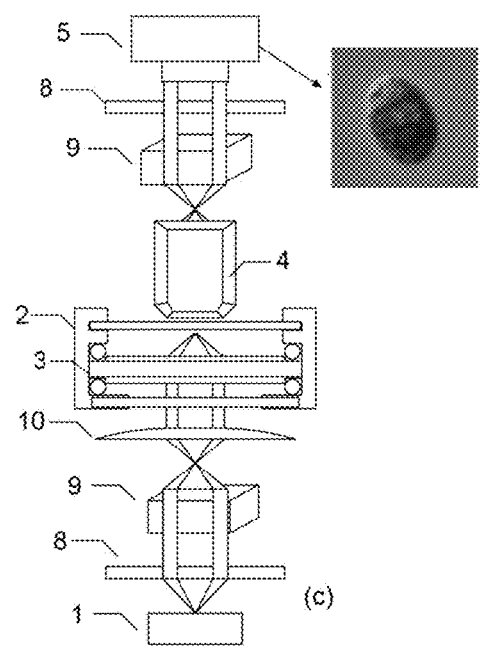

FIGS. 2A-2C are schematic diagrams of a specific example of QCM according to an embodiment of the present disclosure, where 1 is a light source, 2 is an electrochemical reaction flow cell with a light window, or a gas or liquid flow cell with a light window, 3 is a QCM chip with an optical label, 4 is an objective lens of a microscope, 5 is a camera (image acquisition device), 6 is a beamsplitter, 7 is a lens of an objective lens combined with a dark-field condenser, 8 is a polarizer, 9 is a Wollaston prism, and 10 is a condensing lens. FIGS. 2A-2C illustrate structures of the QCM when the optical imaging module employs different imaging modes. As shown in FIGS. 2A-2C, FIG. 2A shows a diagram of the resonant frequency imaging detection for the QCM chip using the transmission bright-field imaging mode, FIG. 2B shows a diagram of the resonant frequency imaging detection for the QCM chip using the reflection dark-field imaging mode, and FIG. 2C shows a diagram of the resonant frequency imaging detection for the QCM chip using the differential interference imaging mode, where an image photographed by the camera 5 in FIG. 2C is a differential interference image. Optical path sections in FIG. 2A, FIG. 2B and FIG. 2C are mature commercial optical microscopic imaging systems, which only need to be assembled. For different microscopic imaging optical paths, the flow cell with the light window needs to be designed differently according to the situation of the light window.

Figure 3:
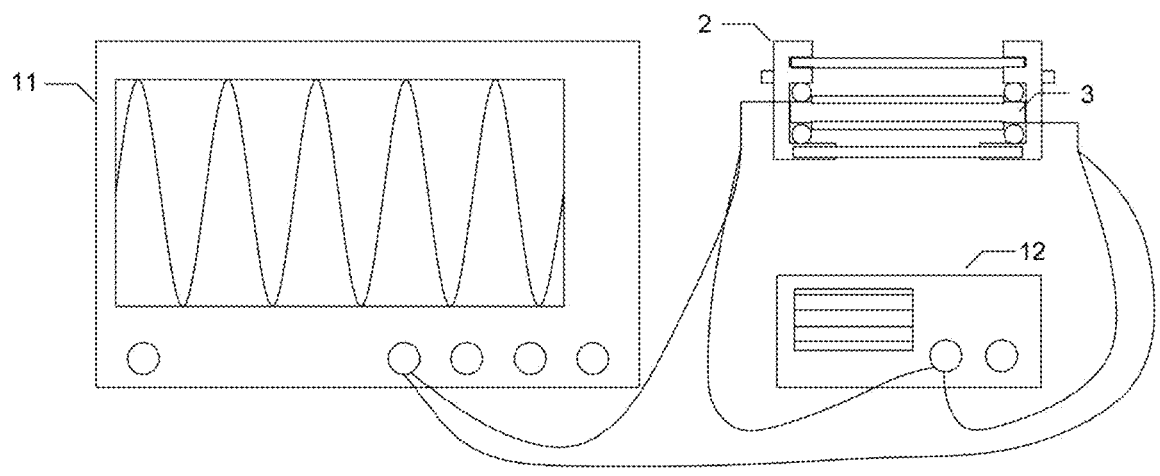
FIG. 3 is a connection diagram of a resonant module according to an embodiment of the present disclosure.

In an embodiment, to test the accuracy of the mass of the sample to be tested determined according to the optical resonant frequency, the resonant module may further include a frequency counter. The frequency counter is configured to collect an electrical resonant frequency of the sample to be tested and send the electrical resonant frequency to the data processing module. The data processing module is also configured to determine the mass of the sample to be tested according to the electrical resonant frequency. The mass of the sample to be tested determined according to the electrical resonant frequency can be used as a reference for the mass of the sample to be tested determined according to the optical resonant frequency. The electrical resonant frequency collected by the frequency counter can be obtained by integrating and averaging the optical resonant frequencies of all positions on the surface of the QCM chip. FIG. 3 is a connection diagram of the resonant module according to an embodiment of the present disclosure, where 2 is the electrochemical reaction flow cell with the light window, or the gas or liquid flow cell with the light window, 3 is the QCM chip with the optical label, 11 is the frequency counter, and 12 is the resonant voltage source. The resonant voltage source is configured to provide an AC voltage signal for the QCM chip, and the frequency counter is configured to measure an electrical frequency, which serves as a reference for the frequency measured by resonant imaging.

In an embodiment, to improve the efficiency and accuracy for obtaining the optical resonant frequency, the image acquisition device may be specifically configured to perform optical imaging on the surface of the QCM chip in a frequency-scanning manner, and send images scanned at different frequencies to the data processing module. A picture can be photographed at each frequency in the frequency-scanning manner, then an ellipticity of the picture is determined, and a typical resonant curve can be obtained by plotting ellipticity against frequency.

In an embodiment, the image acquisition device may be a charge-coupled element, or a phase-locked complementary metal oxide semiconductor (CMOS) device. FIGS. 4A-4C are diagrams of an image acquired by using QCM on the surface of the QCM chip with only an optical label according to an embodiment of the present disclosure. FIG. 4A is a diagram of surface-deposited particles on the surface of the QCM chip with only the optical label, FIG. 4B is an optical image obtained using QCM in a resting state of the surface of the QCM chip with only the optical label, and FIG. 4C is an optical image obtained by using the QCM in a resonant state of the surface of the QCM chip with only the optical label. FIGS. 5A-5C are diagrams of an image obtained by using QCM on the surface of the QCM chip with single particles deposited around a labeled particle according to an embodiment of the present disclosure. In FIGS. 5A-5C, FIG. 5A is a diagram of surface-deposited particles on the surface of the QCM chip with single particles deposited around the labeled particle, FIG. 5B is an optical image obtained using QCM in a resting state of the surface of the QCM chip with single particles deposited around the labeled particle, and FIG. 5C is an optical image obtained by using the QCM in a resonant state of the surface of the QCM chip with single particles deposited around the labeled particle.

As shown in FIGS. 4A-4C, when the charge-coupled element is used for photographing in this embodiment, an exposure time of the charge-coupled element is much higher than a single motion cycle time of the QCM chip, and thus the motion process of the surface of the QCM chip cannot be observed. However, it can be found that by comparing the optical label on the surface of the QCM chip in the resonant state and the unpowered (resting) state, the optical label in the unpowered (resting) state is a circular light spot with bright center and dark periphery, and in the resonant state, the QCM chip reciprocates at a high speed. Because the exposure time is much longer than the period of reciprocating motion, the circular light spot would be elongated into an ellipse along a vibration direction, and an amplitude of the quartz crystal at this light spot can be quantitatively obtained by using the ellipticity of the central light spot. A picture can be photographed at each frequency in the frequency-scanning manner, then an ellipticity of the picture is determined, and a typical resonant curve can be obtained by plotting ellipticity against frequency. The ellipticity away from the optical resonant frequency is 1, and the ellipticity at the optical resonant frequency is maximum (>1).

As shown in FIG. 4C, in the resonant state, the high-speed reciprocating motion of the QCM chip causes broadening of the optical label image.

As shown in FIGS. 4A-4C and FIGS. 5A-5C, compared with a case that no particles are deposited, the ellipticity of the optical label decreases significantly due to the increase of local mass, and the mass change can be determined by the change of the optical resonant frequency of the optical label.

FIGS. 6A-6C show the principle of depositing multiple optical labels for high-throughput array analysis. By a micromachining technology, 100 optical label particles can be formed on a gold film, which are arranged in a 10*10 array. By using a protein array chip technology, 100 different protein molecules can be modified with each spot as the center, and the size of each micro-region may be about 100 microns. When molecules in the solution are selectively bound to a specific protein region, the resonant frequency of the optical label at the center of the region would decrease accordingly, thus improving the efficiency of the conventional QCM by 100 times. As shown in FIG. 6C, different ellipticities of particle images reflect the local mass distribution.

In an embodiment, to improve the efficiency and accuracy for obtaining the optical resonant frequency, the data processing module is specifically configured to, when the image acquisition device is the charge-coupled element, perform the following processing on images scanned at multiple frequencies sent by the charge-coupled element: determining full widths at half maximum (FWHMs) of a light spot in the image in a first direction and a second direction; comparing the FWHM of the light spot in the first direction with that of the light spot in the second direction, and taking a ratio of a larger value to a smaller value in the comparison result as an ellipticity; determining a relationship curve between the ellipticity and the frequency according to multiple frequencies and corresponding ellipticities; and taking a frequency corresponding to a maximum ellipticity in the relationship curve as the optical resonant frequency of the sample to be tested, where the first direction is perpendicular to the second direction.

In an embodiment, to improve the efficiency and accuracy for obtaining the optical resonant frequency, the data processing module is specifically configured to, when the image acquisition device is the charge-coupled element, fit the images scanned at different frequencies sent by the charge-coupled element to obtain a fitted image for each frequency, determine a motion path range of the light spot in the fitted image by a deconvolution algorithm, determine a relationship curve between the motion path range of the light spot and the frequency according to multiple frequencies and corresponding motion path ranges of the light spot, and take a frequency corresponding to a maximum of the motion path range in the relationship curve as the optical resonant frequency of the sample to be tested.

There are three methods for acquiring the optical resonant frequency by using the charge-coupled element. The first method is a one-dimensional fitting method, which refers to fitting FWHMs of the acquired image along x and y directions respectively, comparing the FWHM in the x direction with the FWHM in the y direction, taking a ratio of the larger value to the smaller value in the comparison result as an ellipticity, and acquiring a curve with ellipticity versus frequency through a frequency-scanning driving mode, where the optical resonant frequency is obtained when the ellipticity is the maximum. The second method is a two-dimensional fitting method, which refers to performing two-dimensional fitting on the acquired image to obtain an FWHM in an ellipse long-axis direction and an FWHM in an ellipse short-axis direction as well as an included angle between an axial direction of the ellipse and a horizontal direction of the image, taking a ratio of the FWHM in the ellipse long-axis direction to the FWHM in the ellipse short-axis direction as an ellipticity, and acquiring a curve with ellipticity versus frequency through the frequency-scanning driving mode, where the optical resonant frequency is obtained when the ellipticity is the maximum. The third method is a deconvolution method, which refers to taking an image result of the high-speed motion of the surface of QCM chip photographed by a low-frequency camera as the convolution of a static image and a motion path of the surface of QCM chip, adopting the deconvolution algorithm to acquire the motion path by simultaneously photographing the static image and the fuzzy image of the high-speed motion, plotting a curve with the motion path range versus frequency in the frequency-scanning driving mode, where the optical resonant frequency is obtained when the motion path range is the maximum.

In an embodiment, to improve the efficiency and accuracy for obtaining the optical resonant frequency, the data processing module is specifically configured to, when the image acquisition device is the phase-locked CMOS device, determine optical intensities of the images scanned at different frequencies sent by the phase-locked CMOS device, determine a relationship curve between the optical intensity of the image and the frequency according to the multiple frequencies and corresponding optical intensities of the images, and take a frequency corresponding to a maximum optical intensity in the relationship curve as the optical resonant frequency of the sample to be tested.

A method for acquiring optical resonant frequencies by the phase-locked CMOS device and fitting vibration amplitudes of the surface of the QCM is a hardware solution. The embodiment of the present disclosure is the secondary development for the application of the phase-locked CMOS device. When high-frequency vibration occurs in the QCM chip, images with the same intensity and opposite phases would appear on both sides of the sample of the image captured by the phase-locked CMOS device. The greater the vibration amplitude of the surface of the QCM, the greater the optical intensity with the same intensity and opposite phases on both sides of the sample, and a curve with optical intensity versus frequency is plotted. This method can reduce the difficulty of image post-processing process.

Compared with the conventional QCM in the prior art, the QCM in an embodiment of the present disclosure includes a resonant module, an optical imaging module, and a data processing module. The resonant module includes an assembly model, and a resonant voltage source. The assembly model includes a QCM chip, and a surface of the QCM chip carries a sample to be tested. The resonant voltage source is configured to drive the QCM chip. The optical imaging module includes a microscope, and an image acquisition device. The assembly model is fixed on an objective stage of the microscope. The microscope is configured to magnify the sample to be tested. The image acquisition device is configured to perform optical imaging on the sample to be tested magnified by the microscope to acquire an image, and send the image to the data processing module. The data processing module is configured to analyze and process the received image to determine an optical resonant frequency of the sample to be tested. The mass of the sample to be tested can be determined according to the optical resonant frequency. The sensitivity of the QCM can be enhanced, without the limitation of Sauerbrey equation, and the resonant frequencies of different positions on the QCM chip are simultaneously measured, thus realizing the multi-channel and multi-sample detection of a single chip.

To improve the sensitivity of the QCM without the limitation of Sauerbrey equation, and simultaneously measure the resonant frequencies of different positions of the QCM chip to achieve the multi-channel and multi-sample detection of the single chip, an embodiment of the present disclosure further provides a detection method based on the QCM, which is applied to the QCM mentioned above. FIG. 7 is a flow chart of the detection method based on the QCM according to an embodiment of the present disclosure. As shown in FIG. 7, the detection method based on the QCM may include:

Step 701: acquiring an image of the surface of the QCM chip, where the surface of the QCM chip carries the sample to be tested, and the image is acquired by performing optical imaging on the sample to be tested magnified by the microscope;

Step 702: analyzing and processing the image to determine an optical resonant frequency of the sample to be tested; and Step 703: determining mass of the sample to be tested according to the optical resonant frequency of the sample to be tested.

In an embodiment, to determine the accuracy of the optical resonant frequency of the sample to be tested, the detection method based on the QCM may also include: acquiring an electrical resonant frequency of the sample to be tested, where the electrical resonant frequency is obtained by counting on the QCM chip with the frequency counter. The QCM including the frequency counter may be configured to perform electrical resonant frequency measurement, and the electrical resonant frequency measured by the frequency counter is used as a reference for the optical resonant frequency measured by resonant imaging. The electrical resonant frequency acquired by the frequency counter can be obtained by integrating and averaging the optical resonant frequencies of all positions on the surface of the QCM chip.

In an embodiment, analyzing and processing the image to determine the optical resonant frequency of the sample to be tested may include: performing the following processing on images scanned at different frequencies, where the images scanned at different frequencies are sent by the image acquisition device as the charge-coupled element: determining FWHMs of a light spot in the image in a first direction and a second direction; comparing the FWHM of the light spot in the first direction with that of the light spot in the second direction, and taking a ratio of a larger value to a smaller value in the comparison result as an ellipticity; determining a relationship curve between the ellipticity and the frequency according to multiple frequencies and corresponding ellipticities; and taking a frequency corresponding to a maximum ellipticity in the relationship curve as the optical resonant frequency of the sample to be tested, where the first direction is perpendicular to the second direction.

Figure 9A:
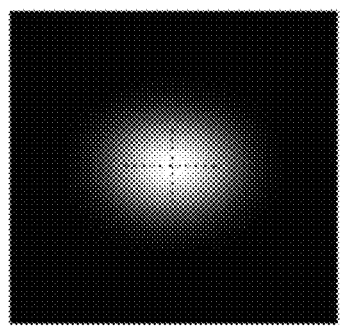
FIGS. 9A-9B are schematic diagrams for determining an ellipticity when an amplitude is 10 pixels according to an embodiment of the present disclosure.
Figure 9B:
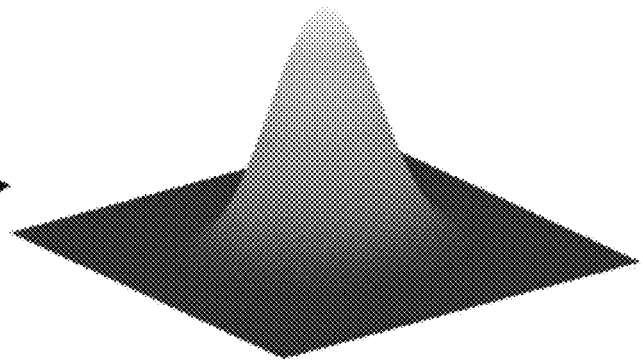
Figure 10:
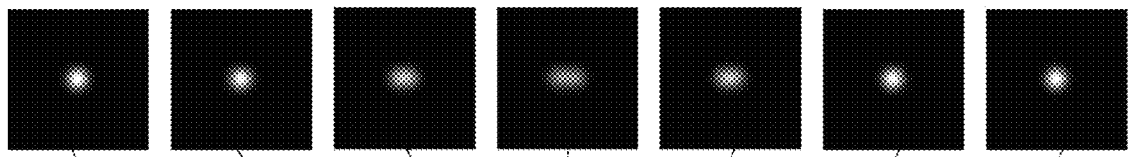
FIG. 10 is a diagram for optical resonant frequency detection when an image acquisition device is a charge-coupled element according to an embodiment of the present disclosure.
Figure 10:
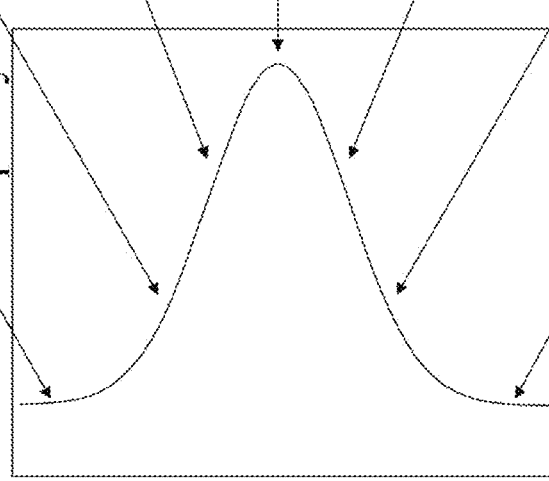

FIGS. 8A-8B are schematic diagrams for determining an ellipticity when an amplitude is 0 pixel according to an embodiment of the present disclosure. FIG. 8A is an optical image of the surface of the QCM chip when the amplitude is 0 pixel according to an embodiment of the present disclosure, and FIG. 8B is a plotting result for two-dimensional fitting using the optical image of the surface of the QCM chip when the amplitude is 0 pixel according to an embodiment of the present disclosure, in which a height is an optical intensity value. FIGS. 9A-9B are schematic diagrams for determining an ellipticity when an amplitude is 10 pixels according to an embodiment of the present disclosure. FIG. 9A is an optical image of the surface of the QCM chip when the amplitude is 10 pixels according to an embodiment of the present disclosure, and FIG. 9B is a plotting result for two-dimensional fitting using the optical image of the surface of the QCM chip when the amplitude is 10 pixels according to an embodiment of the present disclosure, in which a height is an optical intensity value. As shown in FIGS. 8A-8B and FIGS. 9A-9B, a method for determining the ellipticity may be the two-dimensional fitting method. FWHM can be obtained by performing two-dimensional fitting on an image of the light spot, a ratio of FWHM of the ellipse long axis to FWHM of the ellipse short axis is used as the ellipticity, and a curve with the ellipticity versus frequency shown in FIG. 10 is acquired in the frequency-scanning manner. The frequency corresponding to the maximum ellipticity can be accurately determined by a fitting mode, and the corresponding frequency is the optical resonant frequency corresponding to the position of the optical label on the surface of the QCM chip.

In an embodiment, analyzing and processing the image to determine the optical resonant frequency of the sample to be tested may include: performing the following processing on images scanned at different frequencies, where the images scanned at different frequencies are sent by the image acquisition device as the charge-coupled element: fitting the images scanned at different frequencies to obtain a fitted image for each frequency, determining a motion path range of the light spot in the fitted image by a deconvolution algorithm, determining a relationship curve between the motion path range of the light spot and the frequency according to multiple frequencies and corresponding motion path ranges of the light spot, and taking a frequency corresponding to a maximum of the motion path range in the relationship curve as the optical resonant frequency of the sample to be tested. FIG. 10 is a diagram of the optical resonant frequency detection when the image acquisition device is the charge-coupled element according to an embodiment of the present disclosure. FIG. 10 shows the images of the light spots photographed by the charge-coupled element scanning at different frequencies and the corresponding ellipticities, and also shows a relationship curve between ellipticity and frequency.

According to the detection method of the QCM based on resonant imaging principle provided by this embodiment, this embodiment further provides a frequency detection method, which may include the following steps:

Step (1): pretreating the QCM chip, and adding an optical label on its surface through an electrochemical deposition method;

Step (2): loading the QCM chip into a gas flow cell with a light window;

Step (3): taking the reflection dark-field imaging mode as an example, fixing an assembly model composed of the QCM and the gas flow cell on the objective stage of the microscope, and turning on the light source and the charge-coupled element;

Step (4): turning on the resonant voltage source and a power supply of the frequency counter for preheating, electrically connecting the assembly model composed of the QCM and the gas flow cell to the resonant voltage source and the frequency counter, and adjusting focal lengths of the microscope and the image acquisition device;

Step (5): outputting an AC signal using the resonant voltage source, and synchronously recording a vibration image of the optical label of the QCM chip and an electrical resonant frequency of the frequency counter by the charge-coupled element; and Step (6): fitting the recorded image, and further fitting the fitted ellipticity to acquire a resonant frequency, i.e., the optical resonant frequency.

Figure 11C:
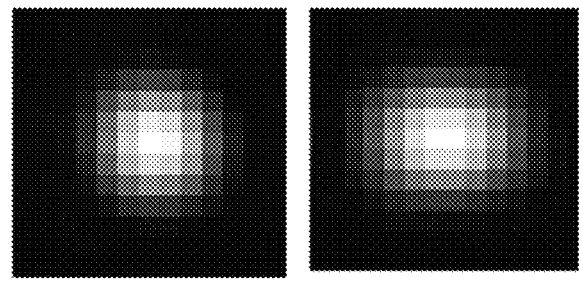
Figure 11C:
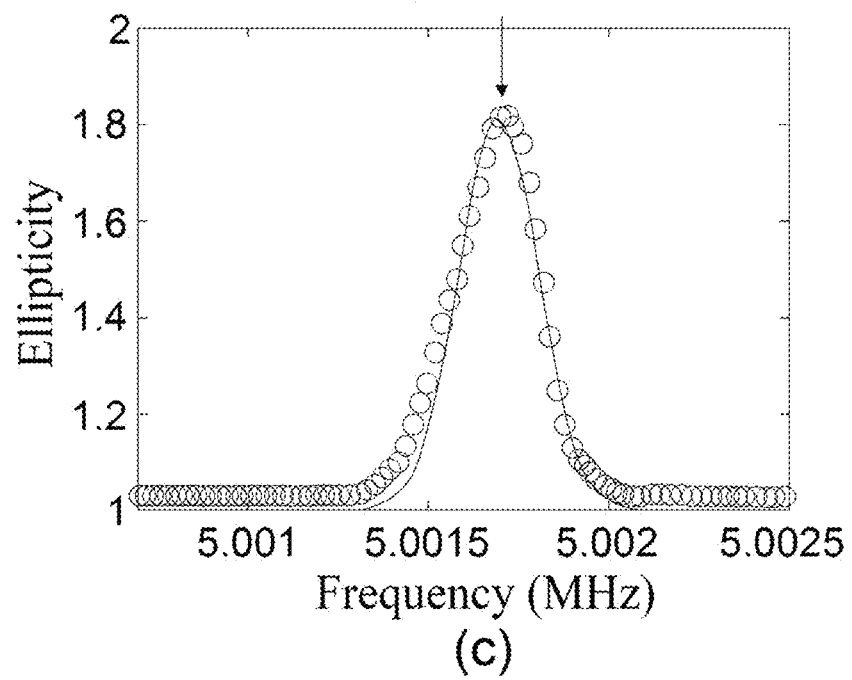

Taking a molecular sieve as an example, an accurate optical resonant frequency can be obtained according to the above steps. FIGS. 11A-11C are schematic diagrams of a resonant frequency of the QCM chip obtained by the detection method based on the QCM according to an embodiment of the present disclosure. FIG. 11A is an original image of particles on the surface of the QCM chip, FIG. 11B is an image with the maximum amplitude of the surface of the QCM chip, and FIG. 11C is a graph showing a relationship curve between the ellipticity and frequency of the QCM chip obtained by the detection method based on the QCM according to an embodiment of the present disclosure. As shown in FIG. 11C, the optical resonant frequency according to the above steps is 5,001,649.1 Hz.

In an embodiment, analyzing and processing the image to determine the optical resonant frequency of the sample to be tested may include: performing the following processing on images scanned at different frequencies, where the the images scanned at different frequencies are sent by the image acquisition device as the phase-locked CMOS device: determining optical intensities of the images scanned at different frequencies, determining a relationship curve between the optical intensity of the image and the frequency according to the multiple frequencies and corresponding optical intensities of the images, and taking a frequency corresponding to a maximum optical intensity in the relationship curve as the optical resonant frequency of the sample to be tested.

Figure 12A:
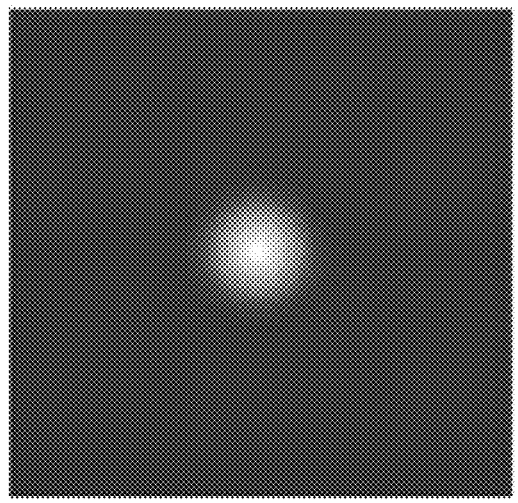
FIGS. 12A-12D are diagrams for optical resonant frequency detection when an image acquisition device is a phase-locked complementary metal oxide semiconductor (CMOS) device according to an embodiment of the present disclosure.
Figure 12B:
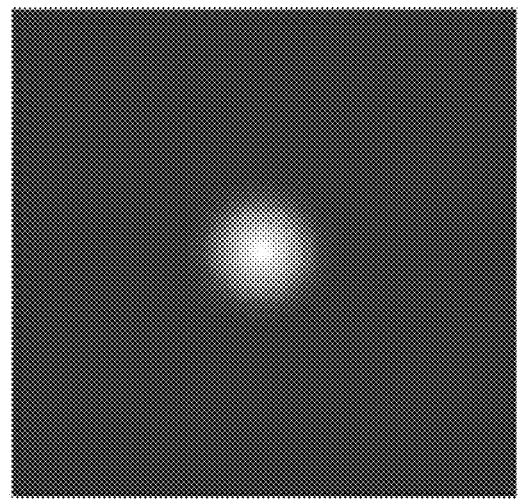
Figure 12C:
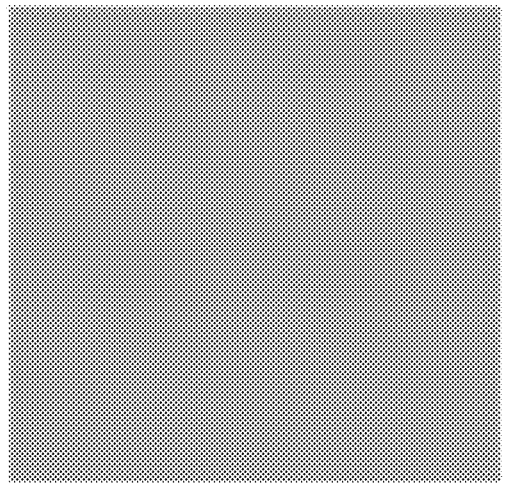
Figure 12D:
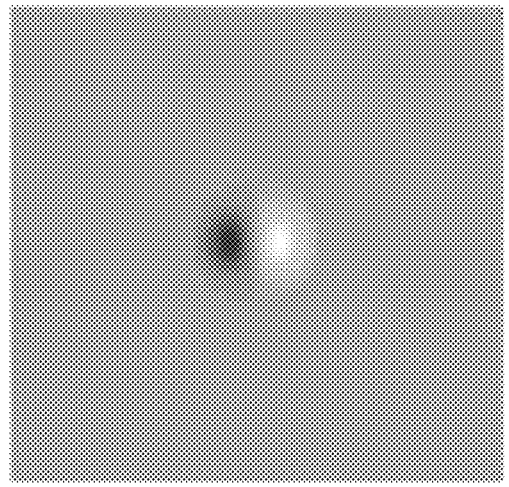

FIGS. 12A-12D are diagrams for optical resonant frequency detection when the image acquisition device is the phase-locked CMOS device according to an embodiment of the present disclosure. DC component information, vibration amplitude information and phase information can be obtained from the image acquired by the phase-locked CMOS device. FIG. 12A is a DC component diagram of the image of the surface of the QCM with the amplitude of 0 pixel when the image acquisition device is the phase-locked CMOS device according to an embodiment of the present disclosure, FIG. 12B is a DC component diagram of the image of the surface of the QCM with the amplitude of 0.5 pixel when the image acquisition device is the phase-locked CMOS device according to an embodiment of the present disclosure, FIG. 12C is an vibration amplitude diagram of the image of the surface of the QCM with the amplitude of 0 pixel when the image acquisition device is the phase-locked CMOS device according to an embodiment of the present disclosure, and FIG. 12C is an vibration amplitude diagram of the image of the surface of the QCM with the amplitude of 0.5 pixel when the image acquisition device is the phase-locked CMOS device according to an embodiment of the present disclosure. As shown in FIG. 12C, there is no phase information and vibration amplitude information when the amplitude is 0 pixel. As shown in FIG. 12D, when vibration with the amplitude of 0.5 pixel occurs in the QCM chip, images with the same intensity and opposite phases would appear on both sides of the sample of the captured image, which is shown as a crescent-shaped pattern in FIG. 12D, with a phase difference of 180° between both sides. The greater the vibration amplitude of the surface of the QCM, the greater the optical intensity with the same intensity and opposite phases on both sides of the sample, and a curve with the optical intensity of the vibration amplitude versus frequency is plotted. This method can reduce the difficulty of image post-processing process. The optical resonant frequency can be determined by fitting the plotted image.

In an embodiment, to implement micro-mass change detection, the detection method based on the QCM may also include: acquiring a first image and a second image, where the first image is an image obtained by performing optical imaging on the sample to be tested before reacting with a reactant, and the second image is an image obtained by performing optical imaging on the sample to be tested after reacting with the reactant; generating a first optical resonant frequency of the sample to be tested according to the first image, and generating a second optical resonant frequency of the sample to be tested according to the second image; determining a first mass of the sample to be tested according to the first optical resonant frequency, and determining a second mass of the sample to be tested according to the second optical resonant frequency; and determining a variation of the mass of the sample to be tested according to the first mass of the sample to be tested and the second mass of the sample to be tested.

According to the detection method of the QCM based on the resonant imaging principle provided by this embodiment, this embodiment further provides a micro-mass change detection method. The method includes the following steps:

Step (1): turning on the phase-locked CMOS device for preheating;

Step (2): turning on the resonant voltage source and the power supply of the frequency counter for preheating, connecting the resonant voltage source, as a synchronization clock, to the phase-locked CMOS device, and connecting another channel of the resonant voltage source to a signal synchronization module of the phase-locked CMOS device to detect the accuracy of a synchronization signal;

Step (3): taking the reflection dark-field imaging mode as an example, fixing an assembly model composed of the QCM chip and the gas flow cell on the objective stage of the microscope, and turning on the light source;

Step (4): adjusting a focal length of an optical imaging system;

Step (5): outputting an AC signal by the resonant voltage source, synchronously recording a vibration amplitude intensity image of the optical label of the QCM chip and an electrical resonant frequency of the frequency counter by the phase-locked CMOS device;

Step (6): extracting the vibration amplitude intensity of the recorded image, and further fitting the vibration amplitude intensity to obtain the optical resonant frequency;

Step (7): performing single-particle reaction to test a reaction frequency in the reaction process;

Step (8): extracting the vibration amplitude intensity of the recorded image after the end of the reaction, and further fitting the vibration amplitude intensity to obtain the optical resonant frequency; and Step (9): converting the change of reaction frequency in the reaction process into mass change to acquire a kinetic curve of mass change, where measured values of the frequency before and after the reaction would be used as a benchmark of frequency change.

Figure 13:
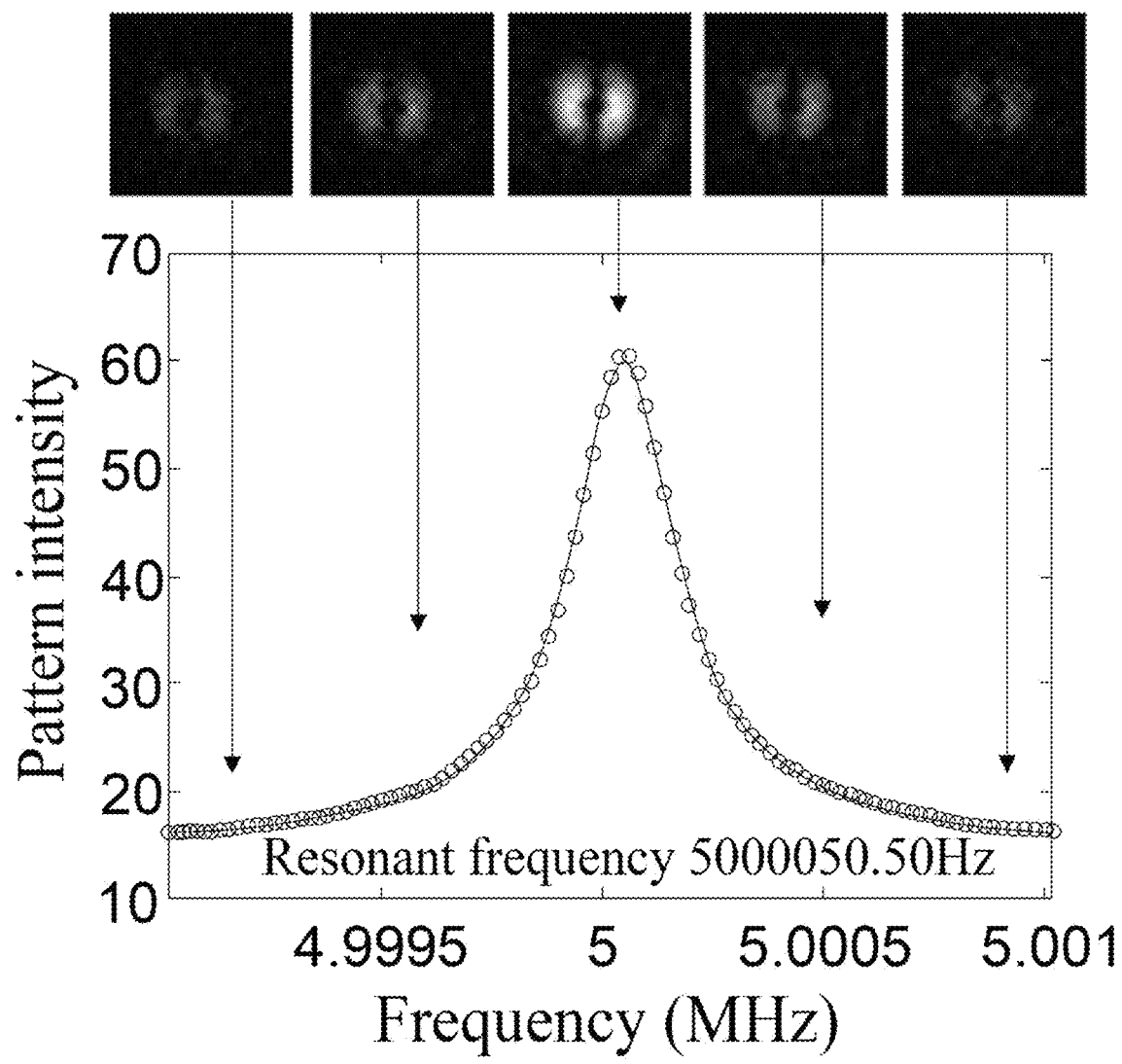
FIG. 13 is a graph showing a relationship of pattern intensity of a QCM chip photographed by a phase-locked CMOS device and a frequency according to an embodiment of the present disclosure.
Figure 15A:
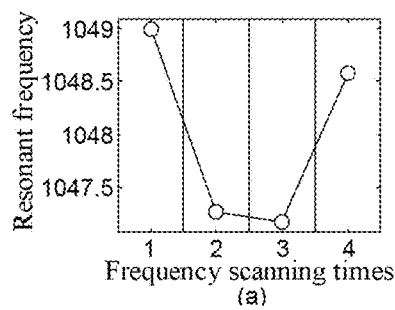
FIGS. 15A-15L are diagrams showing resonant frequency changes of 12 molecular sieves during ammonia adsorption and ammonia desorption in a QCM according to an embodiment of the present disclosure.
Figure 15B:
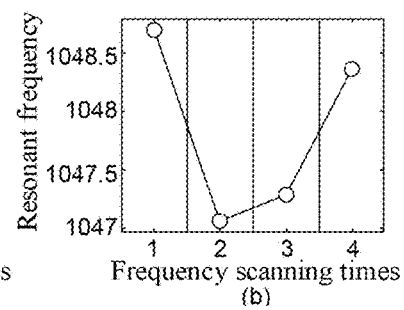
Figure 15C:
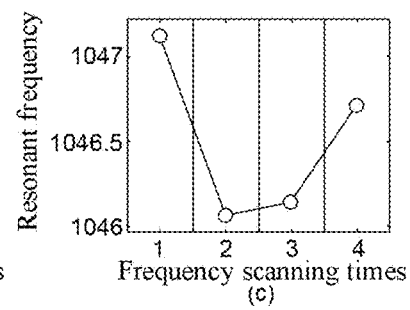
Figure 15D:
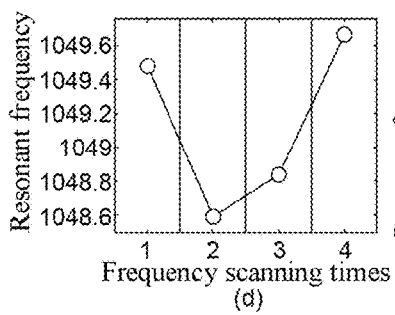
Figure 15E:
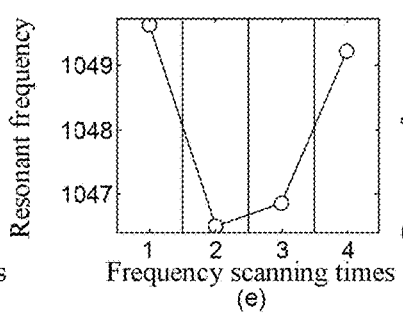
Figure 15F:
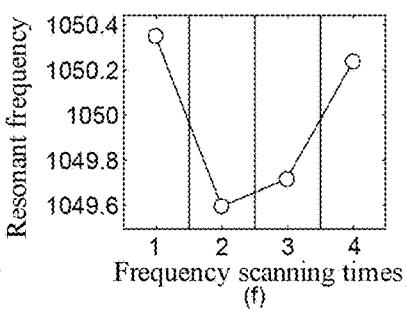
Figure 15G:
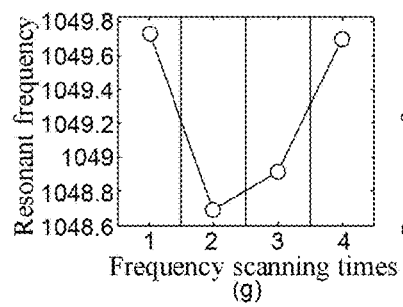
Figure 15H:
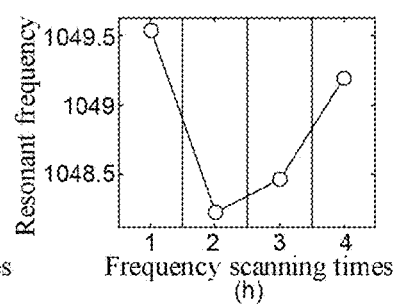
Figure 15I:
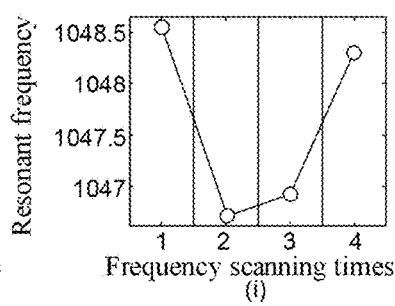
Figure 15J:
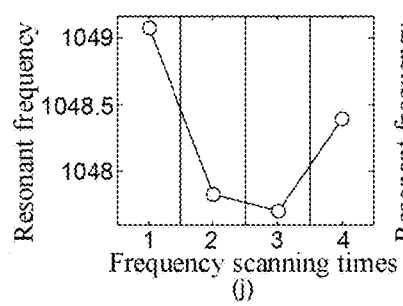
Figure 15K:
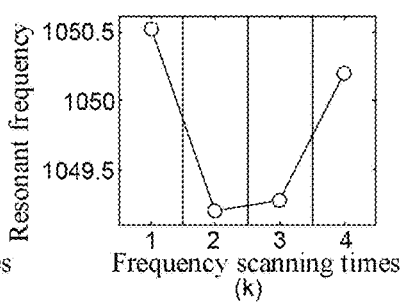
Figure 15L:
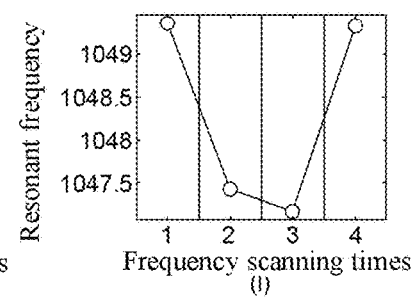

FIG. 13 is a graph showing a relationship of pattern intensity of the QCM chip photographed by the phase-locked CMOS device versus frequency according to an embodiment of the present disclosure. Taking a molecular sieve as an example, an accurate optical resonant frequency can be obtained according to the above steps. As shown in FIG. 13, the amplitudes of particles on the surface of the QCM chip are different at different frequencies. The relationship curve of pattern intensity of the QCM chip photographed by the phase-locked CMOS device versus the frequency is fitted, and the frequency value corresponding to the maximum vibration amplitude intensity of the image before reaction is measured, that is, the optical resonant frequency before reaction is 5,000,050.50 Hz.

Further, FIGS. 14A-14B are diagrams for frequency change before and after one hour of nitrogen purge of the molecular sieve (inert to nitrogen) without any reaction, using QCM according to an embodiment of the present disclosure. FIG. 14A is a diagram for frequency change before the one hour of nitrogen purge of the molecular sieve (inert to nitrogen) without any reaction, using QCM according to an embodiment of the present disclosure, and as shown in FIG. 14A, it is known that the molecular sieve does not absorb nitrogen, and the resonant frequency of the molecular sieve is measured to be 5,000,050.50 Hz before the nitrogen is introduced. FIG. 14B is a diagram for frequency change after one hour of nitrogen purge of the molecular sieve (inert to nitrogen) without any reaction, using QCM according to an embodiment of the present disclosure, and as shown in FIG. 14B, the resonant frequency of the molecular sieve is measured to be 5,000,050.41 Hz after the nitrogen is introduced for 1 hour. After repeating for many times, it can be proved that the frequency accuracy of the QCM measured using the resonant principle can reach 0.1 Hz.

FIGS. 15A-15L are diagrams showing resonant frequency changes of 12 molecular sieves during ammonia adsorption and ammonia desorption in the QCM according to an embodiment of the present disclosure. FIGS. 15A-15L are diagrams for resonant frequency changes of the first to twelfth molecular sieves during ammonia adsorption and ammonia desorption in the QCM according to an embodiment of the present disclosure, respectively. As shown in FIGS. 15A-15L, the reaction process includes introducing nitrogen first, and followed by ammonia. In this experiment, one frequency scanning is carried out before the gases are introduced, and again after the gases are completely introduced. In FIGS. 15A-15L, the frequency scanning times on the horizontal coordinate refer to the stages of this experiment, that is, the first frequency scanning is carried out before ammonia is introduced, the frequency is tested again after the ammonia is introduced for stabilizing for a period of time (the second frequency scanning), the third frequency scanning is carried out after the ammonia is introduced but before the nitrogen is introduced, and the fourth frequency scanning is carried out after the nitrogen is introduced. That is, ammonia adsorption leads to an increase in mass, causing the resonant frequency at the location of the particles to decrease; and the nitrogen purge leads to desorption for portion of the ammonia and a decrease in mass, causing the resonant frequency at the location of the particles to increase. The 12 molecular sieve particles are simultaneously detected in this process, validating the potential of the multi-channel detection. Meanwhile, as the particle of the single molecular sieve has the volume of only 1 cubic micron, and the mass of 1.96 pg, while its ammonia adsorption mass is only 2%, and its mass change is only 40 fg, it indicates that the mass sensitivity of the QCM can be greatly improved through the change of the detection principle, thus laying a foundation for further high-throughput measurement of micro-mass mass in the future.

Compared with the conventional micro-mass detection method in the prior art, the QCM in an embodiment of the present disclosure includes a resonant module, an optical imaging module, and a data processing module. The resonant module includes an assembly model, and a resonant voltage source. The assembly model includes a QCM chip, and a surface of the QCM chip carries a sample to be tested. The resonant voltage source is configured to drive the QCM chip. The optical imaging module includes a microscope, and an image acquisition device. The assembly model is fixed on an objective stage of the microscope. The microscope is configured to magnify the sample to be tested. The image acquisition device is configured to perform optical imaging on the sample to be tested magnified by the microscope to acquire an image, and send the image to the data processing module. The data processing module is configured to analyze and process the received image to determine an optical resonant frequency of the sample to be tested. The mass of the sample to be tested can be determined according to the optical resonant frequency. The sensitivity of the QCM can be enhanced, without the limitation of Sauerbrey equation, and the resonant frequencies of different positions on the QCM chip are simultaneously measured, thus realizing the multi-channel and multi-sample detection of a single chip.

An embodiment of the present disclosure further provides a data synchronization apparatus, as described in the following embodiments. Because the principle of the apparatus for solving the problem is similar to the detection method based on the QCM, the implementation of the apparatus can refer to the implementation of the detection method based on the QCM, and the repetition would not be elaborated here.

Figure 16:
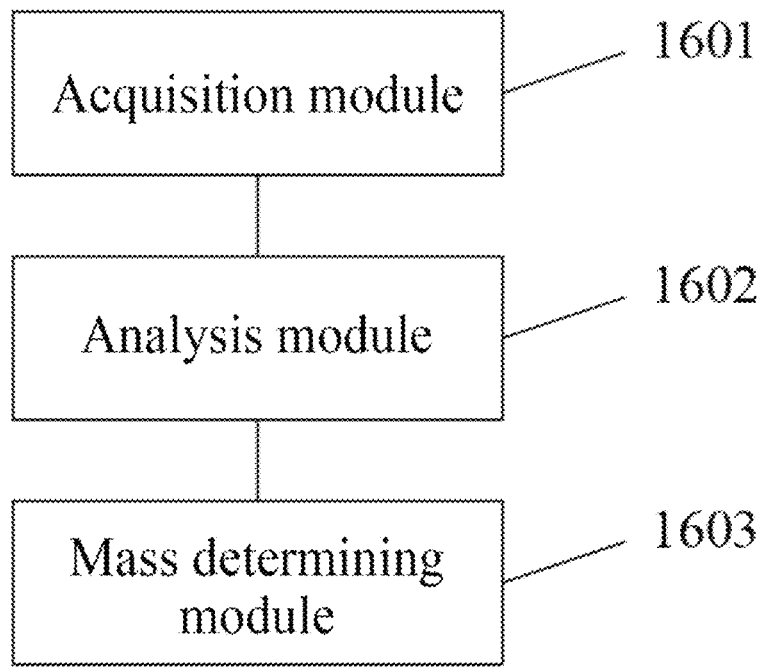
FIG. 16 is a structural block diagram of a data synchronization apparatus according to an embodiment of the present disclosure.

FIG. 16 is a structural block diagram of the detection apparatus based on the QCM according to an embodiment of the present disclosure. As shown in FIG. 16, the detection apparatus based on the QCM is applied to the QCM mentioned above, and may include:

an acquisition module 1601, configured to acquire an image of the surface of the QCM chip, where the surface of the QCM chip carries a sample to be tested, and the image is acquired by performing optical imaging on the sample to be tested magnified by the microscope;

an analysis module 1602, configured to analyze and process the image to determine an optical resonant frequency of the sample to be tested; and a mass determining module 1603, configured to determine mass of the sample to be tested according to the optical resonant frequency of the sample to be tested.

In an embodiment, the detection apparatus based on the QCM may also include an electrical resonant frequency determining module, configured to:

acquire an electrical resonant frequency of the sample to be tested, where the electrical resonant frequency is acquired by using the frequency counter to collect the sample to be tested carried on the surface of the QCM chip; and determine the mass of the sample to be tested according to the electrical resonant frequency of the sample to be tested.

In an embodiment, the detection apparatus based on the QCM may also include a mass variation determining module, configured to:

acquire a first image and a second image, where the first image is an image obtained by performing optical imaging on the sample to be tested before reacting with a reactant, and the second image is an image obtained by performing optical imaging on the sample to be tested after reacting with the reactant;

generate a first optical resonant frequency of the sample to be tested according to the first image, and generate a second optical resonant frequency of the sample to be tested according to the second image;

determine a first mass of the sample to be tested according to the first optical resonant frequency, and determine a second mass of the sample to be tested according to the second optical resonant frequency; and determine a variation of the mass of the sample to be tested according to the first mass of the sample to be tested and the second mass of the sample to be tested.

In an embodiment, the analysis module 1602 is specifically configured to:

perform the following processing on images scanned at different frequencies, where the images scanned at different frequencies are sent by the image acquisition device as the charge-coupled element:

determining FWHMs of a light spot in the image in a first direction and a second direction;

comparing the FWHM of the light spot in the first direction with that of the light spot in the second direction, and taking a ratio of a larger value to a smaller value in the comparison result as an ellipticity; and determining a relationship curve between the ellipticity and the frequency according to multiple frequencies and corresponding ellipticities; and taking a frequency corresponding to a maximum ellipticity in the relationship curve as the optical resonant frequency of the sample to be tested, where the first direction is perpendicular to the second direction.

In an embodiment, the analysis module 1602 is specifically configured to:

perform the following processing on images scanned at different frequencies, where the images scanned at different frequencies are sent by the image acquisition device as the charge-coupled element:

fitting the images scanned at different frequencies to obtain a fitted image for each frequency, and determining a motion path range of the light spot in the fitted image by a deconvolution algorithm; and determining a relationship curve between the motion path range of the light spot and the frequency according to multiple frequencies and corresponding motion path ranges of the light spot, and taking a frequency corresponding to a maximum of the motion path range in the relationship curve as the optical resonant frequency of the sample to be tested.

In an embodiment, the analysis module 1602 is specifically configured to:

perform the following processing on images scanned at different frequencies, where the images scanned at different frequencies are sent by the image acquisition device as the phase-locked CMOS device:

determining optical intensities of the images scanned at different frequencies; and determining a relationship curve between the optical intensity of the image and the frequency according to the multiple frequencies and corresponding optical intensities of the images, and taking a frequency corresponding to a maximum optical intensity in the relationship curve as the optical resonant frequency of the sample to be tested.

Figure 17:
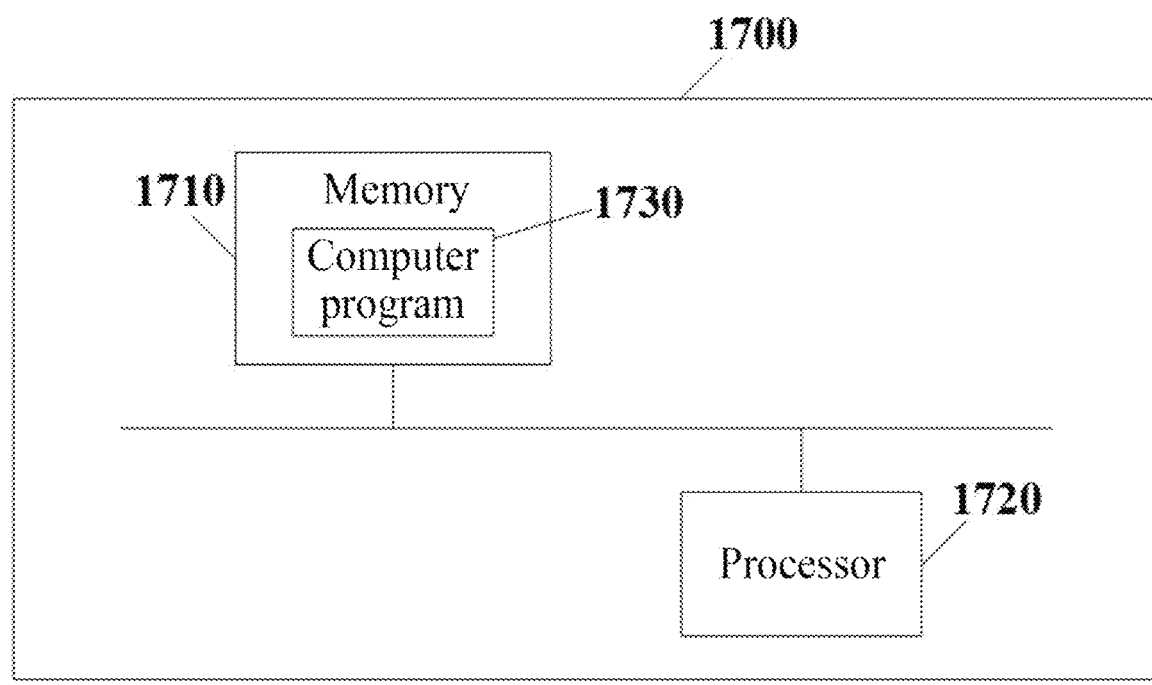
FIG. 17 is a structural diagram of a computer device according to an embodiment of the present disclosure.

Based on the inventive conception above, as shown in FIG. 17, the present disclosure further provides a computer device 1700, including a memory 1710, a processor 1720, and a computer program 1730 stored on the memory 1710 and run on the processor 1720, where the processor 1720, when executing the computer program 1730, implements the detection method based on the QCM above.

Based on the inventive conception above, the present disclosure further provides a computer readable storage medium storing a computer program, where the computer program, when executed by a processor, implements the detection method based on the QCM above.

Based on the inventive conception above, the present disclosure further provides a computer program product, including a computer program. The computer program, when executed by a processor, implements the detection method based on the QCM above.

According to the embodiment of the present disclosure, the frequency detection idea of the conventional QCM is changed, and the resonant frequency detection of the quartz crystal is converted into optical detection from electrical detection, thereby greatly improving the throughput of the conventional QCM detection while ensuring the accuracy of frequency measurement. According to the present disclosure, the resonant frequencies of different positions of the QCM chip can be measured simultaneously through the resonant imaging principle, thus studying the resonant frequency change of inhomogeneous single-particle samples distributed at different positions and studying the mass change of the single-particle sample in the reaction process. Because it does not have to focus on the mass change of the whole chip surface, the mass sensitivity of the QCM can be accurate to the fg level. Meanwhile, a variety of different samples can be deposited on the surface of the chip by various technologies to implement multi-channel and multi-sample detection of the single chip. The present disclosure provides a brand-new detection principle in the field of micro-mass detection, which broadens the scope of the QCM application, and improves the sensitivity of the QCM. In addition, as the apparatus has broken through the theoretical limitation of Sauerbrey equation, a detection limit of the QCM can be greatly improved without improving the resonant frequency of the QCM. The present disclosure has beneficial effects that the detection throughput of the QCM is improved in a breakthrough manner, and the detection limit of the QCM is greatly improved.

Those skilled in the art should understand that the embodiments of the present disclosure may be provided as methods, systems, or computer program products. Therefore, the present disclosure can take the form of an entirely hardware embodiment, an entirely software embodiment, or an embodiment combining software with hardware aspects. Moreover, the present disclosure can take the form of a computer program product implemented on one or more computer-usable storage media (including but not limited to a disk storage, a CD-ROM (Compact Disc Read-only Memory), an optical storage, etc.) containing computer-usable program codes embodied therein.

The present disclosure is described with reference to flowcharts and/or block diagrams of methods, devices (systems), and computer program products according to embodiments of the present disclosure. It should be understood that each flow and/or block in the flowchart and/or block diagram, and combinations of the flow and/or block in the flowchart and/or block diagram can be implemented by computer program instructions. These computer program instructions may be provided to a general-purpose computer, a special-purpose computer, an embedded processor or a processor of other programmable data processing devices to produce a machine, such that the instructions which are executed by the processor of the computer or other programmable data processing devices produce an apparatus for implementing the functions specified in one or more flows in the flow chart and/or one or more blocks in the block diagram.

These computer program instructions may also be stored in a computer-readable memory that can direct a computer or other programmable data processing devices to operate in a particular manner, such that the instructions stored in the computer-readable memory can produce an article of manufacture including an instruction apparatus, and the instruction apparatus can implement the functions specified in one or more flows in the flow chart and/or one or more blocks in the block diagram.

These computer program instructions may also be loaded onto the computer or other programmable data processing devices, such that a series of operational steps are performed on the computer or other programmable devices to produce a computer-implemented process, thus enabling the instruction performed on the computer or other programmable devices to provide steps for implementing functions specified in one or more flows in the flow chart and/or one or more blocks in the block diagram.

The specific embodiments described above further explain the purpose, technical solution and beneficial effects of the present disclosure in detail. It should be understood that the above are only specific embodiments of the present disclosure and are not used to limit the protection scope of the present disclosure. Any modification, equivalent substitution, and improvement, made within the spirit and principle of the present disclosure should be included in the protection scope of the present disclosure.

What is claimed is:

1. A quartz crystal microbalance, comprising a resonant module, an optical imaging module and a data processing module, wherein
    the resonant module comprises an assembly model and a resonant voltage source;
    the assembly model comprises a quartz crystal microbalance chip, wherein a surface of the quartz crystal microbalance chip carries a sample to be tested, and the resonant voltage source is configured to drive the quartz crystal microbalance chip;
    the optical imaging module comprises a microscope and an image acquisition device;
    the assembly model is fixed on an objective stage of the microscope, wherein the microscope is configured to magnify the sample to be tested; and the image acquisition device is configured to perform optical imaging on the sample to be tested magnified by the microscope to acquire an image, and to send the image to the data processing module;
    the data processing module is configured to analyze and process the image to determine an optical resonant frequency of the sample to be tested; and determine mass of the sample to be tested according to the optical resonant frequency;
    wherein the data processing module is configured to, when the image acquisition device is a charge-coupled element, perform the following processing on images scanned at a plurality of frequencies sent by the charge-coupled element: determining a full width at half maximum (FWHM) of a light spot in the image in a first direction and an FWHM of the light spot in the image in a second direction; comparing the FWHM of the light spot in the first direction with the FWHM of the light spot in the second direction to obtain a comparison result, and taking a ratio of a larger value to a smaller value in the comparison result as an ellipticity; determining a first relationship curve between the ellipticity and the frequency according to the plurality of frequencies and the corresponding ellipticities; and taking a frequency corresponding to a maximum ellipticity in the first relationship curve as the optical resonant frequency of the sample to be tested, wherein the first direction is perpendicular to the second direction; or
    the data processing module is configured to, when the image acquisition device is the charge-coupled element, fit the images scanned at the plurality of frequencies sent by the charge-coupled element to obtain a fitted image for each of the plurality of frequencies, determine a motion path range of a light spot in the fitted image by a deconvolution algorithm, determine a second relationship curve between the motion path range of the light spot in the fitted image and the frequency according to the plurality of frequencies and the corresponding motion path ranges of the light spot in the fitted image, and take a frequency corresponding to a maximum of the motion path range in the second relationship curve as the optical resonant frequency of the sample to be tested; or
    the data processing module is configured to, when the image acquisition device is a phase-locked complementary metal oxide semiconductor device, determine optical intensities of images scanned at the plurality of frequencies sent by the phase-locked complementary metal oxide semiconductor device, determine a third relationship curve between the optical intensity of the image and the frequency according to the plurality of frequencies and the corresponding optical intensities of the images, and take a frequency corresponding to a maximum optical intensity in the third relationship curve as the optical resonant frequency of the sample to be tested.

2. The quartz crystal microbalance according to claim 1, wherein the assembly model further comprises a reaction cell, the quartz crystal microbalance chip is clamped in the reaction cell, the reaction cell is a flow cell or a cell for pre-encapsulating a reactant and the sample to be tested; and the flow cell is configured to provide a flow channel for the reactant, enabling the reactant to react with the sample to be tested on the surface of the quartz crystal microbalance chip;
    the image acquisition device is configured to: perform the optical imaging on the sample to be tested magnified by the microscope before reaction to generate a first image, perform the optical imaging on the sample to be tested magnified by the microscope after reaction to generate a second image, and send the first image and the second image to the data processing module; and the data processing module is configured to: generate a first optical resonant frequency of the sample to be tested according to the first image, generate a second optical resonant frequency of the sample to be tested according to the second image, and determine a variation of the mass of the sample to be tested according to the first optical resonant frequency and the second optical resonant frequency.

3. The quartz crystal microbalance according to claim 2, wherein the reactant is a gas or liquid, and the flow cell is a gas flow cell or a liquid flow cell.

4. The quartz crystal microbalance according to claim 2, wherein the assembly model further comprises a peristaltic pump connected to the flow cell; and the peristaltic pump is configured to drive the reactant to pass through the flow cell.

5. The quartz crystal microbalance according to claim 2, wherein the reaction cell is provided with a light window, and the light window is configured to allow light to enter or exit the reaction cell; and the microscope is configured to magnify the sample to be tested on the surface of the quartz crystal microbalance chip through the light window.

6. The quartz crystal microbalance according to claim 1, wherein the optical imaging module further comprises a light source configured to illuminate the surface of the quartz crystal microbalance chip.

7. The quartz crystal microbalance according to claim 1, wherein the resonant module further comprises a frequency counter configured to acquire an electrical resonant frequency of the sample to be tested, and send the electrical resonant frequency to the data processing module; and the data processing module is configured to determine the mass of the sample to be tested according to the electrical resonant frequency.

8. The quartz crystal microbalance according to claim 1, wherein the surface of the quartz crystal microbalance chip further carries an optical label added by deposition or etching when the sample to be tested meets one or a combination of the following conditions: a volume of the sample to be tested is larger than a preset volume, and an optical contrast of the sample to be tested is smaller than a preset optical contrast; and the data processing module is configured to determine an integral optical resonant frequency of the optical label and the sample to be tested according to the image, determine an optical resonant frequency of the optical label according to a size of the optical label, and determine the mass of the sample to be tested according to the integral optical resonant frequency of the optical label and the sample to be tested as well as the optical resonant frequency of the optical label.

9. The quartz crystal microbalance according to claim 1, wherein an imaging mode of the optical imaging module comprises one of transmission bright-field imaging, reflection bright-field imaging, reflection dark-field imaging or differential interference imaging.

10. The quartz crystal microbalance according to claim 1, wherein the image acquisition device is configured to perform the optical imaging on the sample to be tested on the surface of the quartz crystal microbalance chip in a frequency-scanning manner, and send the images scanned at the plurality of frequencies to the data processing module.

11. A detection apparatus based on a quartz crystal microbalance, comprising:

the quartz crystal microbalance according to claim 1;

an acquisition module, configured to acquire the image of the surface of the quartz crystal microbalance chip, wherein the surface of the quartz crystal microbalance chip carries the sample to be tested, and the image is acquired by performing the optical imaging on the sample to be tested magnified by the microscope;

an analysis module, configured to analyze and process the image to determine the optical resonant frequency of the sample to be tested; and a mass determining module, configured to determine the mass of the sample to be tested according to the optical resonant frequency of the sample to be tested.

12. A detection method based on a quartz crystal microbalance, wherein the detection method is applied to the quartz crystal microbalance according to claim 1, comprising:

acquiring the image of the surface of the quartz crystal microbalance chip, wherein the surface of the quartz crystal microbalance chip carries the sample to be tested, and the image is acquired by performing the optical imaging on the sample to be tested magnified by the microscope;

analyzing and processing the image to determine the optical resonant frequency of the sample to be tested; and determining the mass of the sample to be tested according to the optical resonant frequency of the sample to be tested.

13. The detection method according to claim 12, further comprising:

acquiring an electrical resonant frequency of the sample to be tested, wherein the electrical resonant frequency is acquired by using a frequency counter to collect the quartz crystal microbalance chip; and determining the mass of the sample to be tested according to the electrical resonant frequency of the sample to be tested.

14. The detection method according to claim 12, further comprising:

acquiring a first image and a second image, wherein the first image obtained by performing the optical imagining on the sample to be tested before reacting with a reactant, and the second image is obtained by performing the optical imaging on the sample to be tested after reacting with the reactant;

generating a first optical resonant frequency of the sample to be tested according to the first image, and generating a second optical resonant frequency of the sample to be tested according to the second image;

determining a first mass of the sample to be tested according to the first optical resonant frequency, and determining a second mass of the sample to be tested according to the second optical resonant frequency; and determining a variation of the mass of the sample to be tested according to the first mass of the sample to be tested and the second mass of the sample to be tested.

15. The detection method according to claim 12, wherein analyzing and processing the image to determine the optical resonant frequency of the sample to be tested comprises:

performing the following processing on the images scanned at the plurality of frequencies, wherein the images scanned at the plurality of frequencies are sent by the image acquisition device as the charge-coupled element:

determining the FWHM of the light spot in the image in the first direction and the FWHM of the light spot in the image in the second direction;

comparing the FWHM of the light spot in the first direction with the FWHM of the light spot in the second direction to obtain the comparison result, and taking the ratio of the larger value to the smaller value in the comparison result as the ellipticity; and determining the first relationship curve between the ellipticity and the frequency according to the plurality of frequencies and the corresponding ellipticities, taking the frequency corresponding to the maximum ellipticity in the first relationship curve as the optical resonant frequency of the sample to be tested, wherein the first direction is perpendicular to the second direction.

16. The detection method according to claim 12, wherein analyzing and processing the image to determine the optical resonant frequency of the sample to be tested comprises:

performing the following processing on the images scanned at the plurality of frequencies, wherein the images scanned at the plurality of frequencies are sent by the image acquisition device as the charge-coupled element:

fitting the images scanned at the plurality of frequencies to obtain the fitted image for each of the plurality of frequencies, and determining the motion path range of the light spot in the fitted image by the deconvolution algorithm; and determining the second relationship curve between the motion path range of the light spot in the fitted image and the frequency according to the plurality of frequencies and the corresponding motion path ranges of the light spot in the fitted image, and taking the frequency corresponding to the maximum of the motion path range in the second relationship curve as the optical resonant frequency of the sample to be tested.

17. The detection method according to claim 12, wherein analyzing and processing the image to determine the optical resonant frequency of the sample to be tested comprises:

performing the following processing on the images scanned at the plurality of frequencies, wherein the images scanned at the plurality of frequencies are sent by the image acquisition device as the phase-locked complementary metal oxide semiconductor device:

determining the optical intensities of the images scanned at the plurality of frequencies; and determining the third relationship curve between the optical intensity of the image and the frequency according to the plurality of frequencies and the corresponding optical intensities of the images, and taking the frequency corresponding to the maximum optical intensity in the third relationship curve as the optical resonant frequency of the sample to be tested.

18. A computer device, comprising: a memory, a processor, and a computer program stored on the memory and runnable on the processor, wherein the processor, when executing the computer program, implements the detection method according to claim 12.

19. A computer readable storage medium storing a computer program, wherein the computer program, when executed by a processor, implements the detection method according to claim 12.

20. A computer program product, comprising a computer program, wherein the computer program, when executed by a processor, implements the detection method according to claim 12.

* * * * *